(12) United States Patent
Zhou (10) Patent No.: US 11,434,938 B2
(45) Date of Patent: Sep. 6, 2022

(54) HYDRAULICALLY DRIVEN JOINT FOR ROBOT

(71) Applicant: Jiangsu Dreamwell Dynamics Technology Co., Ltd, Suzhou (CN)

(72) Inventor: Xiaoyun Zhou, Suzhou (CN)

(73) Assignee: Jiangsu Dreamwell Dynamics Technology Co., Ltd, Suzhou (CN)

( * ) Notice: Subject to any disclaimer, the term of this patent is extended or adjusted under 35 U.S.C. 154(b) by 354 days.

(21) Appl. No.: 16/646,004

(22) PCT Filed: Mar. 18, 2019

(86) PCT No.: PCT/CN2019/078451
§ 371 (c)(1),
(2) Date: Mar. 10, 2020

(87) PCT Pub. No.: WO2020/029584
PCT Pub. Date: Feb. 13, 2020

(65) Prior Publication Data
US 2020/0206960 A1      Jul. 2, 2020

(30) Foreign Application Priority Data

Aug. 9, 2018   (CN) .......................... 201810901525.0

(51) Int. Cl.
*F15B 15/12*      (2006.01)
*F15B 13/04*      (2006.01)

(52) U.S. Cl.
CPC .......... *F15B 13/0406* (2013.01); *F15B 15/12* (2013.01)

(58) Field of Classification Search
CPC ............................ F15B 15/12; F15B 13/0406
See application file for complete search history.

(56) References Cited

U.S. PATENT DOCUMENTS

| | | | | |
|---|---|---|---|---|
| 2011/0196509 A1* | 8/2011 | Jansen | ................ | B25J 17/0241 91/499 |
| 2013/0150980 A1* | 6/2013 | Swift | ........................ | A61F 2/70 623/24 |

FOREIGN PATENT DOCUMENTS

| | | |
|---|---|---|
| CN | 2620121 Y | 6/2004 |
| CN | 2931013 Y | 8/2007 |
| CN | 104179746 B | 12/2014 |
| CN | 106737827 A | 5/2017 |
| CN | 107116572 A | 9/2017 |
| CN | 108608459 A | 10/2018 |
| CN | 208841446 U | 5/2019 |

(Continued)

*Primary Examiner* — Kevin R Barss
(74) *Attorney, Agent, or Firm* — Vivacqua Crane PLLC (57) ABSTRACT

Disclosed is a hydraulically driven joint for a robot, which comprises a screw-in cartridge rotary direct-drive electro-hydraulic servo valve and a vane oscillating hydraulic cylinder special for a robot motion joint, the screw-in cartridge rotary direct drive electro-hydraulic servo valve is hereinafter referred to as a hydraulic cartridge rotary direct-drive valve and the vane oscillating hydraulic cylinder special for the robot motion joint is hereinafter referred to as a vane oscillating cylinder, a valve body installation cavity is prefabricated at one end of a center of a center rotating shaft of the vane oscillating cylinder, a shape of the valve body installation cavity is manufactured according to a shape of a plug-in portion of the hydraulic cartridge rotary direct-drive valve, and the hydraulic cartridge rotary direct-drive valve is plugged into the valve body installation cavity.

10 Claims, 7 Drawing Sheets

(56) References Cited

FOREIGN PATENT DOCUMENTS

| | | |
|---|---|---|
| JP | H01120416 A | 5/1989 |
| JP | H0617683 B2 | 3/1994 |
| JP | 2673686 B2 | 11/1997 |
| JP | 6392802 A | 11/1997 |
| WO | 2015007943 | 1/2015 |

* cited by examiner

HYDRAULICALLY DRIVEN JOINT FOR ROBOT

CROSS-REFERENCE TO RELATED APPLICATIONS

This application is a national stage application under 35 U.S.C. 371 of PCT Application PCT/CN/2019/078451, filed on 18 Mar. 2019, which PCT application claimed the benefit of Chinese Patent Application No. 201810901525.0, filed on 9 Aug. 2018, the entire disclosure of each of which are hereby incorporated herein by reference.

TECHNICAL FIELD

The disclosure relates to the technology field of robot joint, and more particularly, to a hydraulically driven joint for a robot.

BACKGROUND

A robot joint is a basic component of a robot, and the performance directly affects an overall performance of the robot. With continuous development of electromechanical technologies such as servo drive, control and sensing technologies, the robot joint shows new characteristics and development trends, such as large torque, high precision, sensitive response, miniaturization, electromechanical integration, standardization, modularization, etc. to adapt to development of a robot technology. At present, the existing robot joint basically adopts a servo motor with a harmonic reducer or a RV reducer, and although the structure is widely used in the field of robots, it is undeniable that a torque density ratio is relatively low and a response is not sensitive enough. Since the hydraulic drive has characteristics of high power density and wide frequency bandwidth of a valve-controlled servo system, all countries in the world are vigorously exploring the application of a hydraulic valve-controlled servo system in a robot application occasion with higher requirements.

SUMMARY

Aiming at the problems above, the disclosure provides a hydraulically driven joint for a robot, which is based on integration of a hydraulic cartridge rotary direct-drive valve and a vane oscillating cylinder, and detection elements of a hydraulic actuator, an electro-hydraulic servo valve, a position sensor and a pressure sensor are subjected to modular integrated design and are applied to a robot joint, so that the development requirements of current robot can be met, and the application occasions of the robot can be expanded.

The hydraulically driven joint for a robot comprises a screw-in cartridge rotary direct-drive electro-hydraulic servo valve and a vane oscillating hydraulic cylinder special for a robot motion joint, the screw-in cartridge rotary direct drive electro-hydraulic servo valve is hereinafter referred to as a hydraulic cartridge rotary direct-drive valve and the vane oscillating hydraulic cylinder special for the robot motion joint is hereinafter referred to as a vane oscillating cylinder, a valve body installation cavity is prefabricated at one end of a center of a center rotating shaft of the vane oscillating cylinder, a shape of the valve body installation cavity is manufactured according to a shape of a plug-in portion of the hydraulic cartridge rotary direct-drive valve, the hydraulic cartridge rotary direct-drive valve is plugged into the valve body installation cavity, and a drive motor of the hydraulic cartridge rotary direct-drive valve is exposed on the center rotating shaft;

the vane oscillating cylinder further comprises an upper cover, a cylinder body, a stator, a lower cover and a side convex vane, the center rotating shaft is connected with the side convex vane through a side convex ring, the stator is arranged at a radial end of the side convex vane relative to the side convex ring when the side convex vane is in a zero position state, an inner wall of the stator is in clearance fit with a corresponding outer wall of the side convex ring, the stator is independent of the side convex ring and is fixedly arranged in a radial position, an area formed by the cylinder body, the side convex ring, the upper cover and the lower cover is divided into a first working cavity and a second working cavity by the side convex vane and the stator, and a first oil port and a second oil port are arranged in the inner wall of the valve body installation cavity; the first oil port is connected with the first working cavity through a first built-in pipeline, the second oil port is connected with the second working cavity through a second built-in pipeline, a channel P and a channel T are also arranged inside the center rotating shaft, and a port P and a port T are provided at an upper end surface of the center rotating shaft;

an other end of the center rotating shaft is fixedly connected with an angle sensor, a bottom of the lower cover is covered with a sealing hood, the sealing hood is connected with a base of the angle sensor through a bolt along a center hole of the angle sensor, a pressure sensor is fixedly installed in an empty cavity formed by the sealing hood and the center rotating shaft, the pressure sensor is fixedly installed on the center rotating shaft, and an induction joint of the pressure sensor is connected with the first oil port and the second oil port; and the port P, the port T, a port A and a port B of the hydraulic cartridge rotary direct-drive valve are arranged according to corresponding ports of the vane oscillating cylinder, under normal working conditions, hydraulic oil at a port P of the vane oscillating cylinder is communicated with one of the first oil port or the second oil port through an internal pipeline of the hydraulic cartridge rotary direct-drive valve, and the other one of the first oil port or the second oil port is communicated with a port T of the vane oscillating cylinder through the internal pipeline of the hydraulic cartridge rotary direct-drive valve.

Further:

the port P and the port T in the upper end surface of the center rotating shaft are respectively plugged with a flared pipe joint;

the hydraulic cartridge rotary direct-drive valve comprises a drive motor, an upper end cover, a valve core, a valve sleeve and a lower end cover, the drive motor is connected with the valve core, the valve sleeve is sheathed on an outer periphery of the valve core, the upper end cover and the lower end cover are sealed at two axial ends of the valve sleeve, the valve core is internally provided with a channel P, a channel T, a channel A and a channel B which are not communicated with each other, the valve body installation cavity is prefabricated with the first oil port and the second oil port, two sides of the side convex vane are respectively provided with a third oil port and a fourth oil port corresponding to the first working cavity and the second working cavity, the third oil port is communicated with the first working cavity, the fourth oil port is communicated with the second working cavity, each third oil port is connected with the first oil port through the first built-in pipeline, the fourth oil port is connected with the second oil port through the second built-in pipeline, a lower surface of the upper end cover and an upper surface of the lower end cover are provided with concave working oil grooves, working edges of the concave working oil grooves are matched with working edges projected by the channel A and the channel B of the valve core for working, outer peripheral annular surfaces of the valve core corresponding to the channel P, the channel A and the channel B are respectively provided with a corresponding first oil through hole, a corresponding second oil through hole is provided at an outer periphery of the valve sleeve, and positions and sizes of the first oil through hole and the second oil through hole ensure that a servo valve can work normally under a working state;

the valve sleeve is sheathed on the outer peripheral annular surface of the valve core, the peripheral annular surface of the valve core and an inner peripheral annular surface of the valve sleeve are assembled in radial clearance fit, the valve core comprises a center shaft, an upper end and a lower end of the center shaft respectively protrude outwardly from a corresponding end surface of the valve sleeve, the upper end cover is covered on the upper end surface of the valve sleeve and is in radial clearance fit with an upper convex portion of the center shaft at the same time, the upper convex portion of the center shaft penetrates through a center through hole and then is connected with an output end of the DC brushless servo motor, the lower end cover is covered on the lower end surface of the valve sleeve, and meanwhile, a center blind hole of the lower end cover is in radial clearance fit with a lower convex portion at a bottom of the center shaft, the two end surfaces of the valve sleeve are fixedly connected with the upper end cover and the lower end cover respectively, and the lower surface of the upper end cover and the upper surface of the lower end cover are provided with the concave working oil grooves;

an external thread is provided at an axial outer peripheral annular surface of the upper end cover, which is used for connection and installation with an internal thread of the valve body installation cavity;

an annular groove is arranged in the center through hole of the upper end cover, a Glyd Ring is embedded in the annular groove, a first stepped shaft is provided at an upper convex end of the center shaft, the first stepped shaft is in radial clearance fit with the center through hole, and an inner wall of the Glyd Ring is tightly attached to a corresponding position area at an upper end of the center shaft; and a second stepped shaft is provided at a lower convex end of the center shaft, and the second stepped shaft is in radial clearance fit with the center blind hole;

two end surfaces of the valve sleeve are fixedly connected with the upper end cover and the lower end cover through an axial screw respectively;

outlines of the working edges projected by the channel A and the channel B of the valve core are in a fan-shaped annular structure, the working edges of the corresponding concave working oil grooves of the upper end cover and the lower end cover are in a fan-shaped annular structure, the working edges of the valve core in a zero position state are respectively fit with the working edges corresponding to the upper end cover and the lower end cover to form a zero opening, and make the channel P, the channel T, the channel A and the channel B be isolated from each other, and due to the fan-shaped annular structure, a magnitude of a rotation angle driving the DC brushless servo motor and a flow form a linear proportional relation, so as to be convenient to control;

a lower portion of the external thread of the upper end cover and the axial outer peripheral annular surface of the valve sleeve are both provided with the annular grooves, an O-type sealing ring with a corresponding size is installed in each annular groove, each O-type sealing ring is respectively perpendicular to the center shaft and adjacent O-type sealing rings are arranged in parallel, and the valve body is plugged and positioned in a positioning cavity of the valve body through the O-type sealing ring to ensure sealing connection of the valve sleeve, the upper end cover and the inner wall of the center shaft;

the drive motor is integrated with a high-precision absolute photoelectric encoder, the output shaft of the drive motor is connected with the first stepped shaft of the valve core through an elastic coupling, and the drive motor is connected with the upper end surface of the upper end cover through a screw;

the bottom of the lower end cover is also provided with an installation positioning notch, which is convenient for radial positioning installation of the whole valve body and the valve body installation cavity;

the upper cover is sheathed on the center rotating shaft and located at an upper portion of the side convex ring, the lower cover is sheathed on the center rotating shaft and located at a lower portion of the side convex ring, equivalent integral outer annular surfaces corresponding to the side convex vane and the stator are sheathed with the cylinder bodies, inner grooves of axial inner ends of the upper cover and the lower cover are respectively provided with an angular contact ball bearing, and inner grooves of axial outer ends of the upper cover and the lower cover are respectively provided with a second Glyd Ring; and an inner ring of the angular contact bearing at a corresponding position is sheathed at a corresponding position of the center rotating shaft, an inner ring of the second Glyd Ring at a corresponding position is sheathed at a corresponding position of the center rotating shaft, and the upper cover and the lower cover are fixedly connected with a corresponding position of the cylinder body through a screw respectively;

the stator is fixedly connected with the lower cover through a pin, a lower end surface of the stator is tightly attached to a corresponding end surface of the lower cover, an outer peripheral surface of the stator is tightly attached to a corresponding inner surface of the cylinder body, and an inner surface of the stator is arranged in clearance fit with a corresponding outer surface of the side convex ring;

a thickness of the side convex vane is greater than that of the side convex ring, stepped surfaces are formed at positions of the side convex ring and the side convex vane, a thickness of the stator is the same as that of the side convex vane, the upper cover and the lower cover are respectively provided with a corresponding inner end convex ring, and an outer side wall of the inner end convex ring is tightly attached to the stator at a corresponding position and is in clearance fit with a corresponding position of the side convex vane to ensure convenient installation and reliable positioning;

an outer surface of the side convex vane is in clearance fit with an inner surface of the corresponding area of the cylinder body, and the upper and lower end surfaces of the side convex vane are respectively arranged in clearance fit with corresponding surfaces of the upper cover and the lower cover;

the upper end surface and the lower end surface of the cylinder body are respectively provided with an end surface annular groove corresponding to inner sides of the surfaces of the upper cover and the lower cover, and the corresponding end surface annular grooves are respectively provided with a second O-type sealing ring; and an inner end of a top of the upper cover is buckled in a first sealed groove at a corresponding upper portion of the center rotating shaft through a first sealed bulge; and an inner end of a bottom of the lower cover is buckled in a second sealed groove at a corresponding lower portion of the center rotating shaft through a second sealed bulge.

A robot motion joint based on integration of the hydraulic cartridge rotary direct-drive valve and the vane oscillating cylinder is disclosed, a constant pressure oil source is inputted by a hydraulic system and connected by the flared pipe joint, and the center rotating shaft is fixed by the screw, so that the stator drives the cylinder body to rotate with the upper cover and the lower cover under an action of pressure oil. When no current is inputted to the hydraulic cartridge rotary direct-drive valve, oil stops flowing at the port P, and at this time, no signal is outputted to the pressure sensor and the angle sensor. When a positive current signal is inputted to the hydraulic cartridge rotary direct-drive valve, the valve core rotates downwardly by a certain angle. At this time, oil flows into the port A and a working pipeline of the channel A of the hydraulic cartridge rotary direct-drive valve from the port P and then reaches the first working cavity of the vane oscillating hydraulic cylinder special for the robot motion joint, the stator drives the cylinder body to rotate with the upper cover and the lower cover under an action of the pressure oil, oil in the second working cavity of the vane oscillating hydraulic cylinder special for the robot motion joint flows out and passes through the port B of the valve core of the hydraulic cartridge rotary direct-drive valve and returns to an oil tank through the Port T. At this time, corresponding detection signals are outputted by both the pressure sensor and the angle sensor and fed back to the hydraulic cartridge rotary direct-drive valve, and a difference value between the outputted signal and the inputted signal is compared until the difference value is zero, so that the vane oscillating hydraulic cylinder special for the robot motion joint rotates to a specified angle and maintains a specified pressure with the first working cavity and the second working cavity, thus achieving accurate position control and torque control. On the contrary, when a negative current signal is inputted to the hydraulic cartridge rotary direct-drive valve, oil flowing through the first working cavity is outlet oil, and oil flowing through the second working cavity is inlet oil, with the same control mode. The disclosure is the joint for the robot based on integration of the hydraulic cartridge rotary direct-drive valve and the vane oscillating cylinder, and detection elements of a hydraulic actuator, an electro-hydraulic servo valve, a position sensor and a pressure sensor are subjected to modular integrated design and are applied to a robot joint, so that the development requirements of current robot can be met, and the application occasions of the robot can be expanded.

THE REFERENCE NUMERALS LIST 1. hydraulic cartridge rotary direct-drive valve; 2. vane oscillating cylinder; 3. angle sensor; 4. sealing hood; 5. pressure sensor; 6. flared pipe joint; 7. O-type sealing ring; 8. installation positioning notch;

11. drive motor; 12. upper end cover; 13. valve core; 131. center shaft; 14. valve sleeve; 15. lower end cover; 16. concave working oil groove; 17. external thread; 18. first oil through hole; 19. second oil through hole; 20. Glyd Ring;

21. center rotating shaft; 22. valve body installation cavity; 23. upper cover; 24. cylinder body; 25. stator; 26. lower cover; 27. side convex vane; 28. side convex ring; 29. first working cavity; 30. second working cavity; 31. first oil port; 32. second oil port; 33. first built-in pipeline; 34. second built-in pipeline; 35. channel 36. channel T; 37. third oil port; 38. fourth oil port; 39. angular contact ball bearing; 40. second Glyd Ring; 41. inner end convex ring; 42. second O-type sealing ring; 43. first sealed bulge; 44. first sealed groove; 45. second sealed bulge; and 46. second sealed groove.

DETAILED DESCRIPTION

A hydraulically driven joint for a robot, as shown in FIG. 1 to FIG. 9, comprises a hydraulic cartridge rotary direct-drive valve 1 and a vane oscillating cylinder 2, wherein a valve body installation cavity 22 is prefabricated at one end of a center of a center rotating shaft 21 of the vane oscillating cylinder 2, a shape of the valve body installation cavity 22 is manufactured according to a shape of a plug-in portion of the hydraulic cartridge rotary direct-drive valve 1, the hydraulic cartridge rotary direct-drive valve 1 is plugged into the valve body installation cavity 22, and a drive motor 11 of the hydraulic cartridge rotary direct-drive valve 1 is exposed on the center rotating shaft 21.

Figure 1:
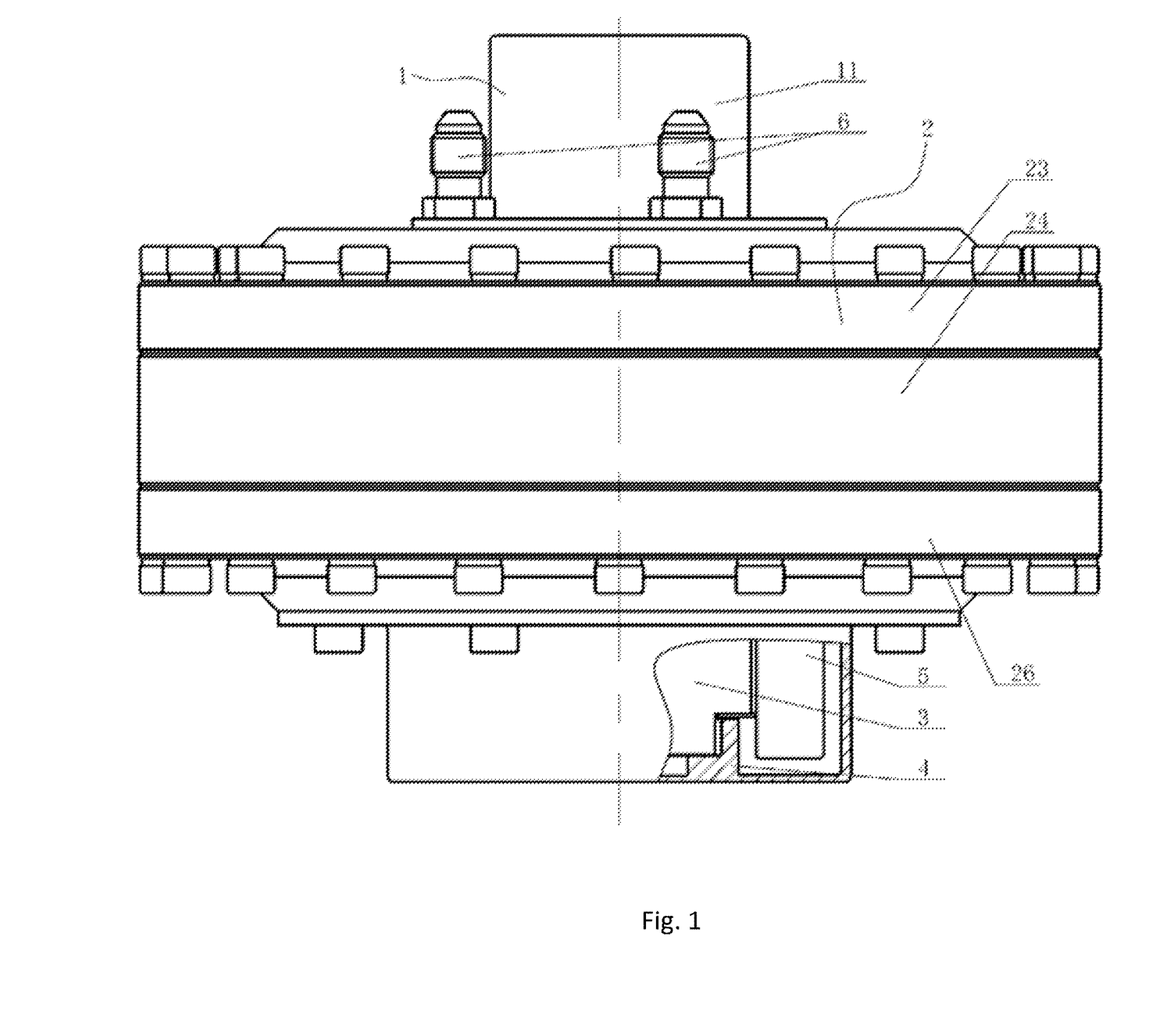
FIG. 1 is a structure diagram of a front view (partial section) of the disclosure.
Figure 2:
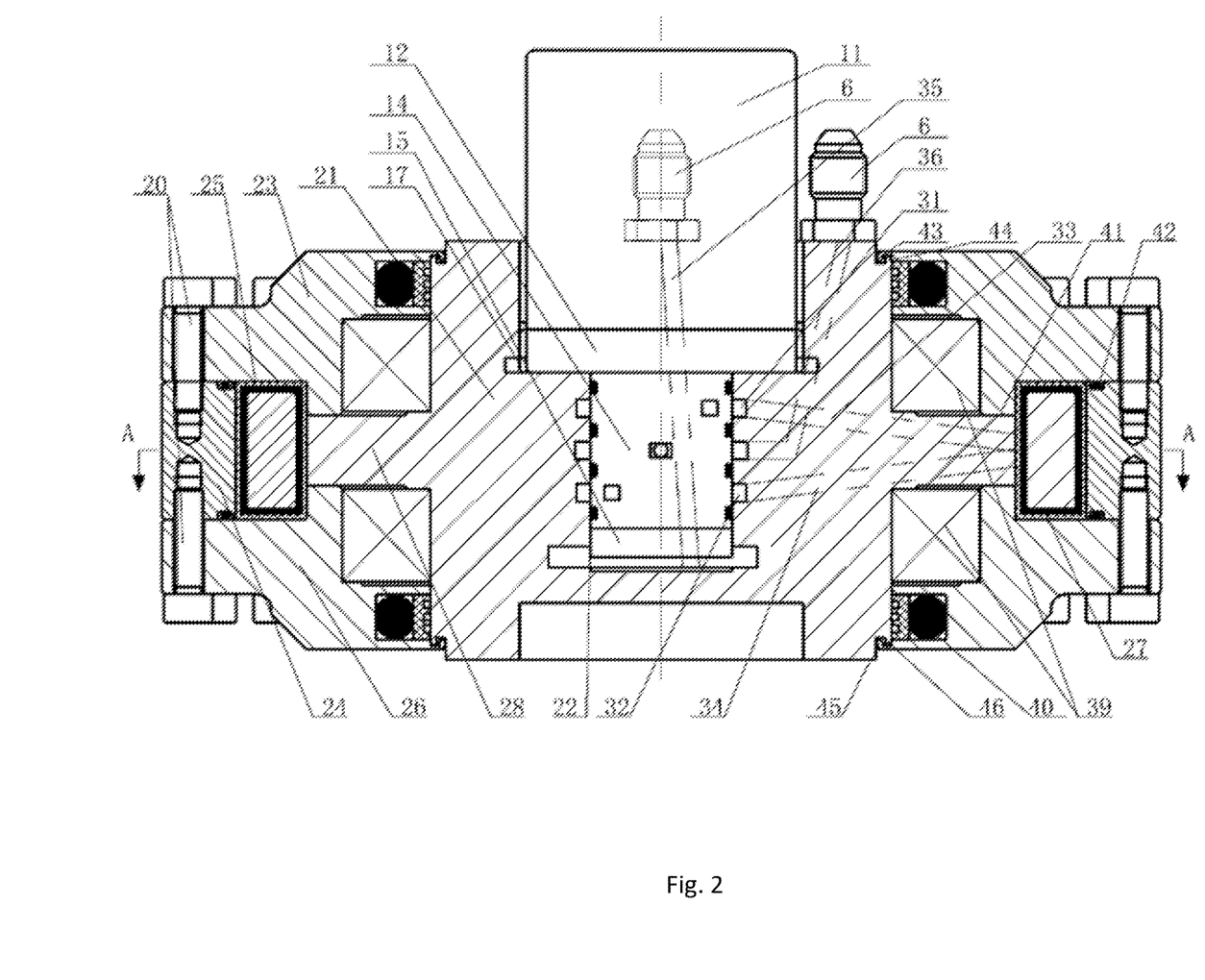
FIG. 2 is a sectional structure diagram of a side view of the disclosure (removing an angle sensor, a sealing hood and a pressure sensor)
Figure 3:
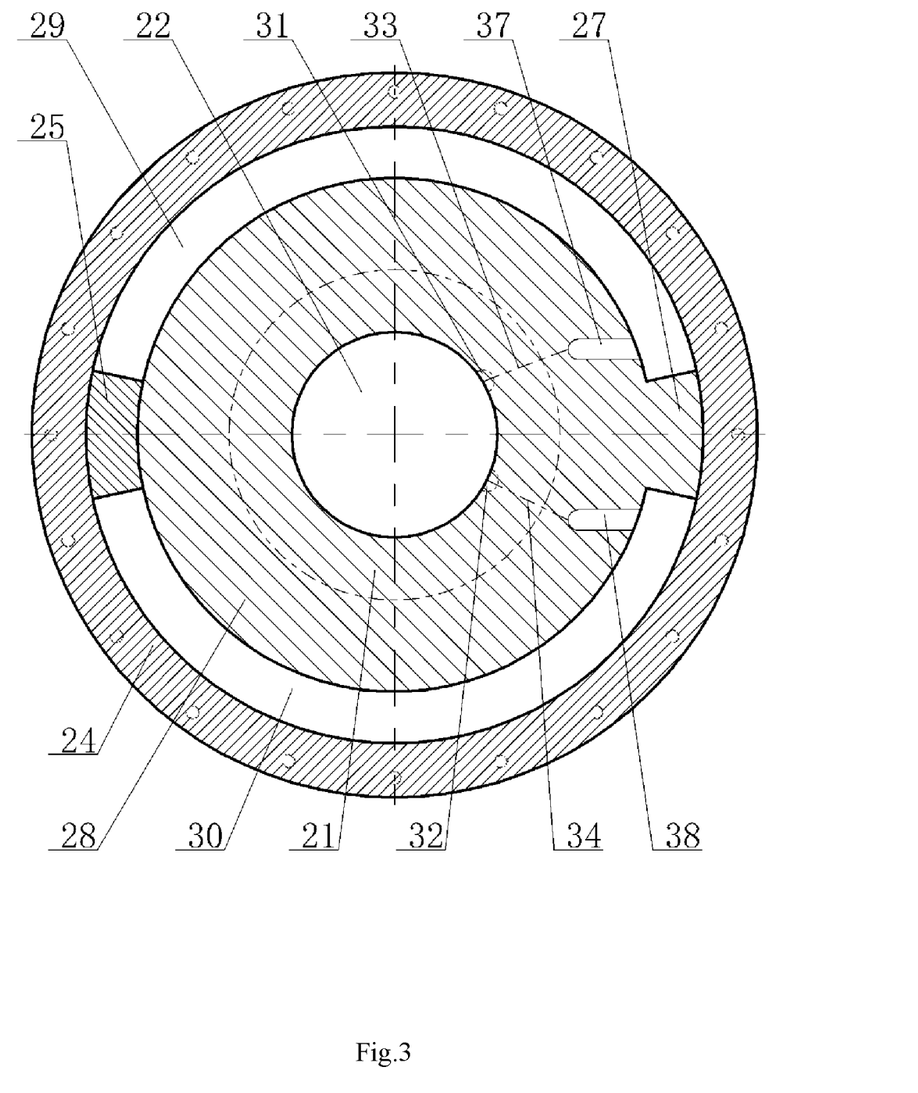
FIG. 3 is a structure diagram of an A-A section of FIG. 2 (removing a hydraulic cartridge rotary direct-drive valve)

The vane oscillating cylinder 2 further comprises an upper cover 23, a cylinder body 24, a stator 25, a lower cover 26 and a side convex vane 27, the center rotating shaft 21 is connected with the side convex vane 27 through a side convex ring 28, the stator 25 is arranged at the other radial end of the side convex vane 27 relative to the side convex ring 28 when the side convex vane 27 is in a zero position state, an inner wall of the stator 25 is in clearance fit with a corresponding outer wall of the side convex ring 28, the stator 25 is independent of the side convex ring 28 and is fixedly arranged in a radial position, an area formed by the cylinder body 24, the side convex ring 28, the upper cover 23 and the lower cover 26 is divided into a first working cavity 29 and a second working cavity 30 by the side convex vane 27 and the stator 25, and a first oil port 31 and a second oil port 32 are arranged in the inner wall of the valve body installation cavity 22; the first oil port 31 is connected with the first working cavity 29 through a first built-in pipeline 33, the second oil port 32 is connected with the second working cavity 30 through a second built-in pipeline 34, a channel P 35 and a channel T 36 are also arranged inside the center rotating shaft 21, and a port P and a port T are provided at an upper end surface of the center rotating shaft 21*i*.

The other end of the center rotating shaft 21 is fixedly connected with an angle sensor 3, a bottom of the lower cover 26 is covered with a sealing hood 4, and the sealing hood 4 is connected with a base of the angle sensor 3 through a bolt along a center hole of the angle sensor. A pressure sensor 5 is fixedly installed in an empty cavity formed by the sealing hood 4 and the center rotating shaft 21, the pressure sensor 5 is fixedly installed on the center rotating shaft 21, and an induction joint of the pressure sensor 5 is connected with the first oil port 31 and the second oil port 32.

The port P, the port T, a port A and a port B of the hydraulic cartridge rotary direct-drive valve 1 are arranged according to corresponding ports of the vane oscillating cylinder 2, under normal working conditions, hydraulic oil at a port P of the vane oscillating cylinder 2 is communicated with one of the first oil port 31 or the second oil port 32 through an internal pipeline of the hydraulic cartridge rotary direct-drive valve 1, and the other one of the first oil port 31 or the second oil port 32 is communicated with a port T of the vane oscillating cylinder 2 through the internal pipeline of the hydraulic cartridge rotary direct-drive valve 1.

The port P and the port T in the upper end surface of the center rotating shaft 21 are respectively plugged with a flared pipe joint 6.

The hydraulic cartridge rotary direct-drive valve 1 comprises a drive motor 11, an upper end cover 12, a valve core 13, a valve sleeve 14 and a lower end cover 15, the drive motor 11 is connected with the valve core 13, the valve sleeve 14 is sheathed on an outer periphery of the valve core 13, the upper end cover 12 and the lower end cover 15 are sealed at two axial ends of the valve sleeve 14, the valve core 13 is internally provided with a channel P, a channel T, a channel A and a channel B which are not communicated with each other, the valve body installation cavity 22 is prefabricated with the first oil port 31 and the second oil port 32, two sides of the side convex vane 27 are respectively provided with a third oil port 37 and a fourth oil port 38 corresponding to the first working cavity 29 and the second working cavity 30, the third oil port 37 is communicated with the first working cavity 29, the fourth oil port 38 is communicated with the second working cavity 30, each third oil port 37 is connected with the first oil port through the first built-in pipeline 33, the fourth oil port 38 is connected with the second oil port 32 through the second built-in pipeline 34, a lower surface of the upper end cover 12 and an upper surface of the lower end cover 15 are provided with concave working oil grooves 16, working edges of the concave working oil grooves 16 are matched with working edges projected by the channel A and the channel B of the valve core 13 for working, outer peripheral annular surfaces of the valve core 13 corresponding to the channel P, the channel A and the channel B are respectively provided with a corresponding first oil through hole 18, a corresponding second oil through hole 19 is provided at an outer periphery of the valve sleeve 14, and positions and sizes of the first oil through hole 18 and the second oil through hole 19 ensure that a servo valve can work normally under a working state.

Figure 4:
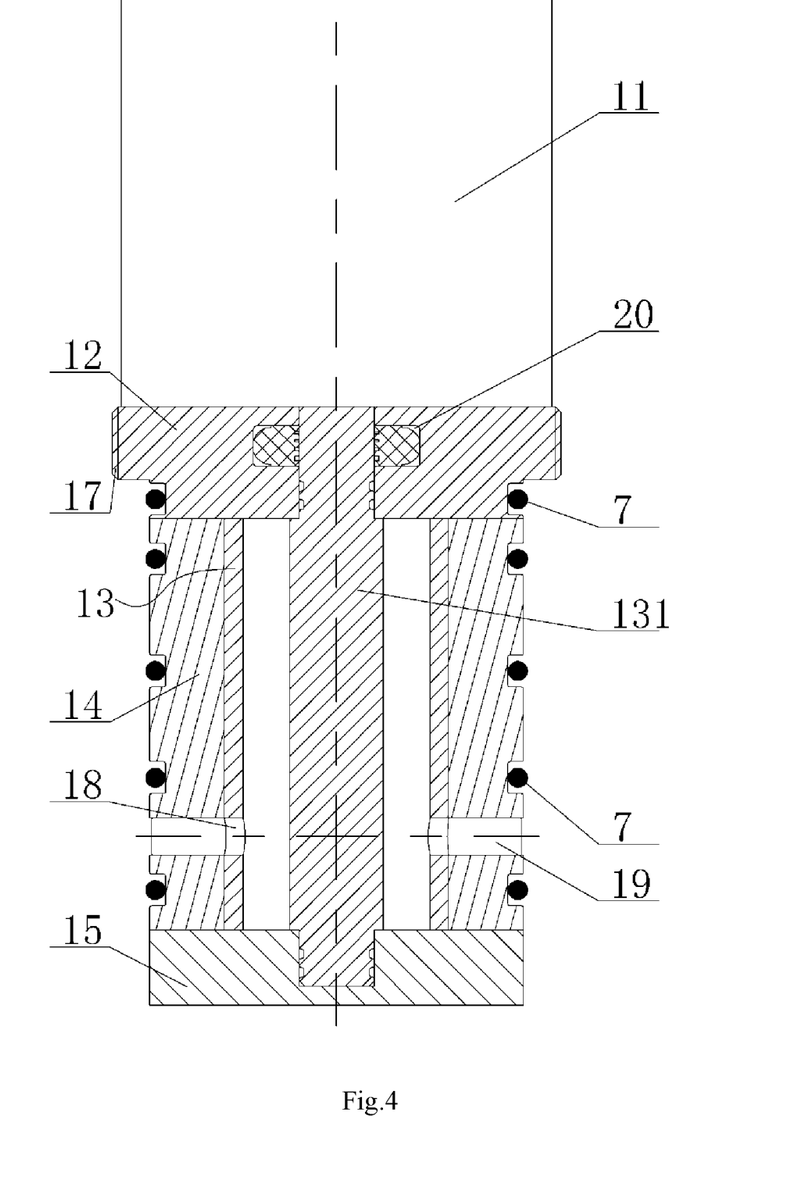
FIG. 4 is a sectional structure diagram of a front view of the hydraulic cartridge rotary direct-drive valve of the disclosure.

A working condition during specific implementation is that: when the valve core rotates, a port P of the second oil through hole at a corresponding position on the valve sleeve is communicated with a port P of the first oil through hole of the valve core, the channel P is communicated with any one of the channel A or the channel B through a working edge of an end cover, and then is connected with the first oil port through the corresponding first oil through hole and the second oil through hole, the other one of the channel A or the channel B is connected with the second oil port through the corresponding first oil through hole and the second oil through hole, the second oil port is connected with the port T of the valve body through an internal channel of the valve body, the port T of the valve body is correspondingly connected with the channel T of the vane oscillating cylinder, and then hydraulic oil is discharged through the port T.

Figure 5:
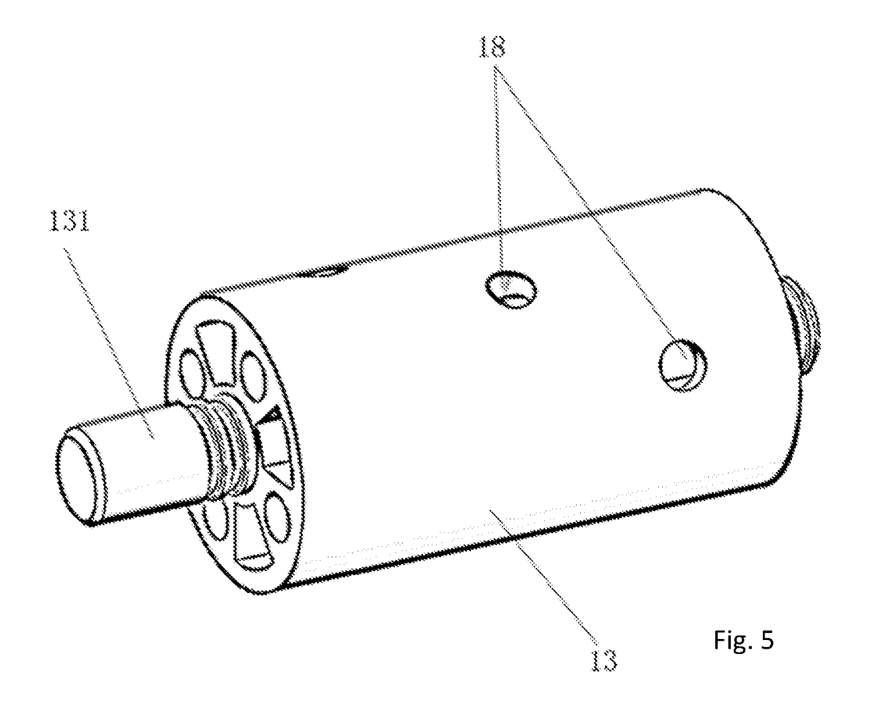
FIG. 5 is a stereoscopic structure diagram of a valve core of FIG. 3.
Figure 6:
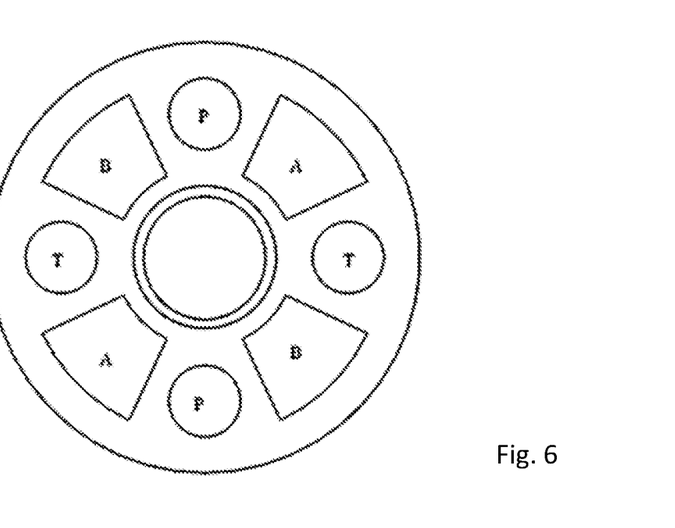
FIG. 6 is a structure diagram of a top view of the valve core of FIG. 4.
Figure 7:
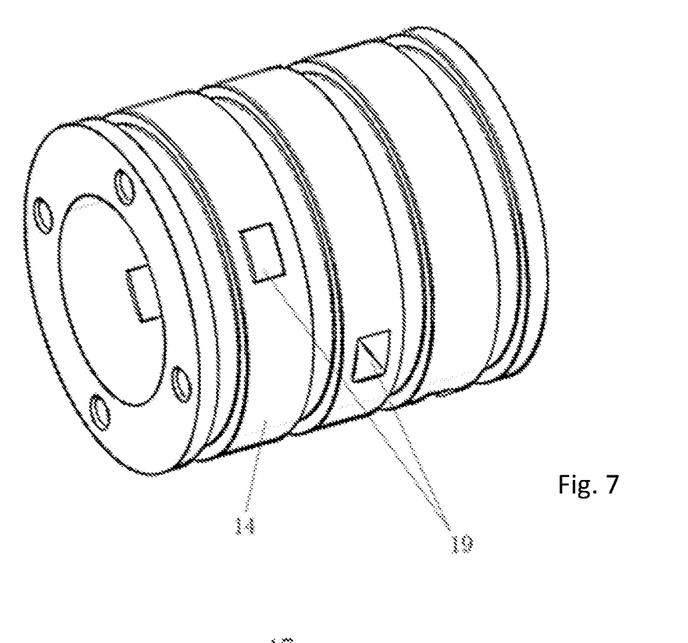
FIG. 7 is a stereoscopic structure diagram of a valve sleeve of FIG. 3.
Figure 8:
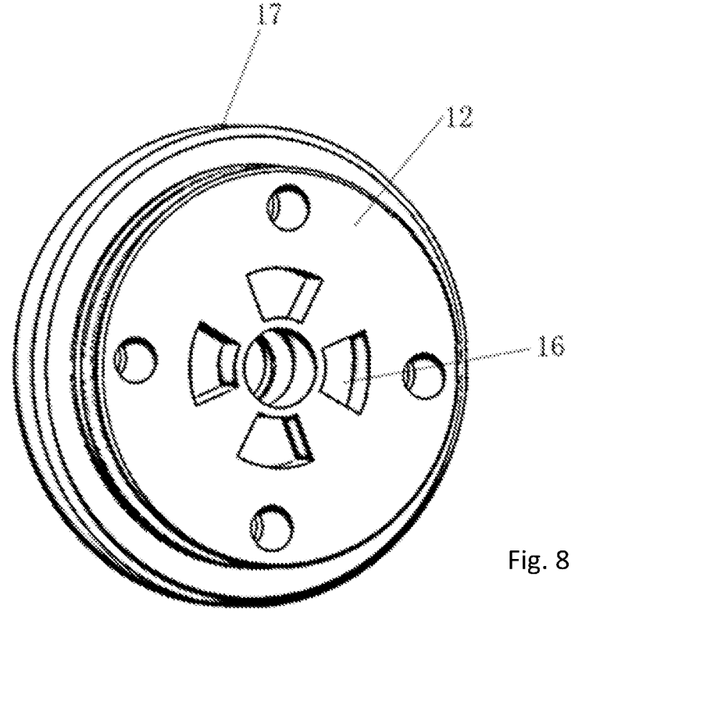
FIG. 8 is a stereoscopic structure diagram of an upper end cover of FIG. 4.

The valve sleeve 14 is sheathed on the outer peripheral annular surface of the valve core 13, the peripheral annular surface of the valve core 13 and an inner peripheral annular surface of the valve sleeve are assembled in radial clearance fit, the valve core 13 comprises a center shaft 131, an upper end and a lower end of the center shaft 131 respectively protrude outwardly from a corresponding end surface of the valve sleeve 14, the upper end cover 12 is covered on the upper end surface of the valve sleeve 14 and is in radial clearance fit with an upper convex portion of the center shaft 131 at the same time, the upper convex portion of the center shaft 131 penetrates through a center through hole and then is connected with an output end of the drive motor 11, the lower end cover 15 is covered on the lower end surface of the valve sleeve 14, a center blind hole of the lower end cover 15 is in radial clearance fit with a lower convex portion at a bottom of the center shaft 131, the two end surfaces of the valve sleeve 14 are fixedly connected with the upper end cover 12 and the lower end cover 15 respectively, and the lower surface of the upper end cover 12 and the upper surface of the lower end cover 15 are provided with the concave working oil grooves 16.

an external thread 17 is provided at an axial outer peripheral annular surface of the upper end cover 12, which is used for connection and installation with an internal thread of the valve body installation cavity 22.

An annular groove is arranged in the center through hole of the upper end cover 12, a Glyd Ring 20 is embedded in the annular groove, a first stepped shaft is provided at an upper convex end of the center shaft 131, the first stepped shaft is in radial clearance fit with the center through hole, and an inner wall of the Glyd Ring 20 is tightly attached to a corresponding position area at an upper end of the center shaft; and a second stepped shaft is provided at a lower convex end of the center shaft 131, and the second stepped shaft is in radial clearance fit with the center blind hole.

Two end surfaces of the valve sleeve 14 are fixedly connected with the upper end cover 12 and the lower end cover 15 through an axial screw respectively.

Outlines of the working edges projected by the channel A and the channel B of the valve core 13 are in a fan-shaped annular structure, the working edges of the corresponding concave working oil grooves 16 of the upper end cover 12 and the lower end cover 15 are in a fan-shaped annular structure, and the working edges of the valve core 13 in a zero position state are respectively fit with the working edges corresponding to the upper end cover 12 and the lower end cover 15 to form a zero opening, and make the channel P, the channel T, the channel A and the channel B be isolated from each other, and due to the fan-shaped annular structure, a magnitude of a rotation angle driving the DC brushless servo motor and a flow form a linear proportional relation, so as to be convenient to control.

A lower portion of the external thread of the upper end cover 12 and the axial outer peripheral annular surface of the valve sleeve 14 are both provided with the annular grooves, an O-type sealing ring 7 with a corresponding size is installed in each annular groove, each O-type sealing ring 7 is respectively perpendicular to the center shaft and adjacent O-type sealing rings 7 are arranged in parallel, and the valve body is plugged and positioned in a positioning cavity 22 of the valve body through the O-type sealing ring 7 to ensure sealing connection of the valve sleeve 14, the upper end cover 12 and the inner wall of the center shaft 21.

The drive motor 11 is integrated with a high-precision absolute photoelectric encoder, the output shaft of the drive motor 11 is connected with the first stepped shaft of the valve core through an elastic coupling, and the drive motor 11 is connected with the upper end surface of the upper end cover 12 through the screw.

Figure 9:
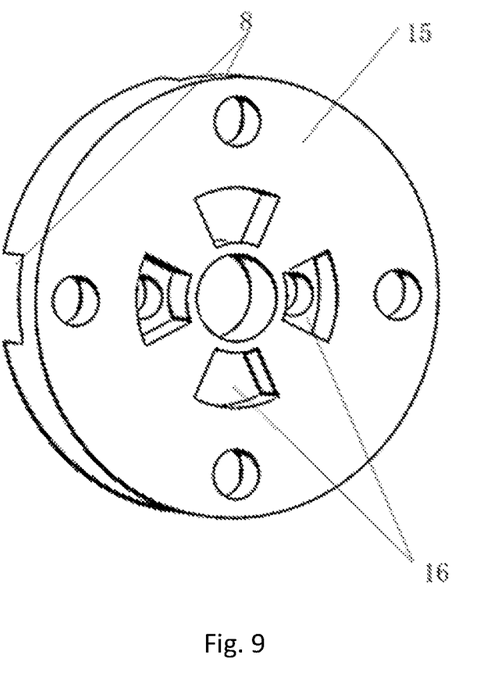
FIG. 9 is a stereoscopic structure diagram of a lower end cover of FIG. 4.

The bottom of the lower end cover 15 is also provided with an installation positioning notch 8, which is convenient for radial positioning installation of the whole valve body and the valve body installation cavity.

The upper cover 23 is sheathed on the center rotating shaft 21 and located at an upper portion of the side convex ring 28, the lower cover 26 is sheathed on the center rotating shaft 21 and located at a lower portion of the side convex ring 28, equivalent integral outer annular surfaces corresponding to the side convex vane 27 and the stator 25 are sheathed with the cylinder bodies 24, inner grooves of axial inner ends of the upper cover 23 and the lower cover 26 are respectively provided with an angular contact ball bearing 39, and inner grooves of axial outer ends of the upper cover 23 and the lower cover 26 are respectively provided with a second Glyd Ring 40; and an inner ring of the angular contact bearing 39 at a corresponding position is sheathed at a corresponding position of the center rotating shaft 21, an inner ring of the second Glyd Ring 40 at a corresponding position is sheathed at a corresponding position of the center rotating shaft 21, and the upper cover 23 and the lower cover 26 are fixedly connected with a corresponding position of the cylinder body 24 through a screw respectively.

The stator 25 is fixedly connected with the lower cover 26 through a pin, a lower end surface of the stator 25 is tightly attached to a corresponding end surface of the lower cover 26, an outer peripheral surface of the stator 25 is tightly attached to a corresponding inner surface of the cylinder body 24, and an inner surface of the stator 25 is arranged in clearance fit with a corresponding outer surface of the side convex ring 28.

A thickness of the side convex vane 27 is greater than that of the side convex ring 28, stepped surfaces are formed at positions of the side convex ring 28 and the side convex vane 27, a thickness of the stator 25 is the same as that of the side convex vane 27, the upper cover 23 and the lower cover 26 are respectively provided with a corresponding inner end convex ring 41, and an outer side wall of the inner end convex ring 41 is tightly attached to the stator 25 at a corresponding position and is in clearance fit with a corresponding position of the side convex vane 27 to ensure convenient installation and reliable positioning.

An outer surface of the side convex vane 27 is in clearance fit with an inner surface of the corresponding area of the cylinder body 24, and the upper and lower end surfaces of the side convex vane 27 are respectively arranged in clearance fit with corresponding surfaces of the upper cover 23 and the lower cover 26.

The upper end surface and the lower end surface of the cylinder body 24 are respectively provided with an end surface annular groove corresponding to inner sides of the surfaces of the upper cover and the lower cover, and the corresponding end surface annular grooves are respectively provided with a second O-type sealing ring 42.

An inner end of a top of the upper cover 23 is buckled in a first sealed groove 44 at a corresponding upper portion of the center rotating shaft 21 through a first sealed bulge 43; and an inner end of a bottom of the lower cover 26 is buckled in a second sealed groove 46 at a corresponding lower portion of the center rotating shaft 21 through a second sealed bulge 45.

The working principle is that: the disclosure is the robot motion joint based on integration of the hydraulic cartridge rotary direct-drive valve and the vane oscillating cylinder, a constant pressure oil source is inputted by a hydraulic system and connected by the flared pipe joint, and the center rotating shaft is fixed by the screw, so that the stator drives the cylinder body to rotate with the upper cover and the lower cover under an action of pressure oil. When no current is inputted to the hydraulic cartridge rotary direct-drive valve, oil stops flowing at the port P, and at this time, no signal is outputted to the pressure sensor and the angle sensor. When a positive current signal is inputted to the hydraulic cartridge rotary direct-drive valve, the valve core rotates downwardly by a certain angle. At this time, oil flows into the port A and a working pipeline of the channel A of the hydraulic cartridge rotary direct-drive valve from the port P and then reaches the first working cavity of the vane oscillating hydraulic cylinder special for the robot motion joint, the stator drives the cylinder body to rotate with the upper cover and the lower cover under an action of the pressure oil, oil in the second working cavity of the vane oscillating hydraulic cylinder special for the robot motion joint flows out and passes through the port B of the valve core of the hydraulic cartridge rotary direct-drive valve and returns to an oil tank through the port T. At this time, corresponding detection signals are outputted by both the pressure sensor and the angle sensor and fed back to the hydraulic cartridge rotary direct-drive valve, and a difference value between the outputted signal and the inputted signal is compared until the difference value is zero, so that the vane oscillating hydraulic cylinder special for the robot motion joint rotates to a specified angle and maintains a specified pressure with the first working cavity and the second working cavity, thus achieving accurate position control and torque control. On the contrary, when a negative current signal is inputted to the hydraulic cartridge rotary direct-drive valve, oil flowing through the first working cavity is outlet oil, and oil flowing through the second working cavity is inlet oil, with the same control mode. The disclosure is the joint for the robot based on integration of the hydraulic cartridge rotary direct-drive valve and the vane oscillating cylinder, and detection elements of a hydraulic actuator, an electro-hydraulic servo valve, a position sensor and a pressure sensor are subjected to modular integrated design and are applied to a robot joint, so that the development requirements of current robot can be met, and the application occasions of the robot can be expanded.

The specific embodiments of the disclosure are described in detail above, but the contents are only preferred embodiments of the disclosure, and cannot be deemed as being used for limiting the implementation scope of the disclosure. Any changes and improvements made according to the application scope of the disclosure shall all fall within the scope of the patent.

What is claimed is:
1. A hydraulically driven joint for a robot, comprising:
a hydraulic cartridge rotary direct-drive valve and a vane oscillating cylinder, wherein a valve body installation cavity is prefabricated at one end of a center of a center rotating shaft of the vane oscillating cylinder, a shape of the valve body installation cavity is manufactured according to a shape of a plug-in portion of the hydraulic cartridge rotary direct-drive valve, the hydraulic cartridge rotary direct-drive valve is plugged into the valve body installation cavity, and a drive motor of the hydraulic cartridge rotary direct-drive valve is exposed on the center rotating shaft;

wherein the vane oscillating cylinder further comprises an upper cover, a cylinder body, a stator, a lower cover and a side convex vane, the center rotating shaft is connected with the side convex vane through a side convex ring, the stator is arranged at a radial end of the side convex vane relative to the side convex ring when the side convex vane is in a zero position state, an inner wall of the stator is in clearance fit with a corresponding outer wall of the side convex ring, the stator is independent of the side convex ring and is fixedly arranged in a radial position, an area formed by the cylinder body, the side convex ring, the upper cover and the lower cover is divided into a first working cavity and a second working cavity by the side convex vane and the stator, and a first oil port and a second oil port are arranged in the inner wall of the valve body installation cavity; the first oil port is connected with the first working cavity through a first built-in pipeline, the second oil port is connected with the second working cavity through a second built-in pipeline, a channel P and a channel T are also arranged inside the center rotating shaft, and a port P and a port T are provided at an upper end surface of the center rotating shaft;

an other end of the center rotating shaft is fixedly connected with an angle sensor, a bottom of the lower cover is covered with a sealing hood, the sealing hood is connected with a base of the angle sensor through a bolt along a center hole of the angle sensor, a pressure sensor is fixedly installed in an empty cavity formed by the sealing hood and the center rotating shaft, wherein the pressure sensor is fixedly installed on the center rotating shaft, and an induction joint of the pressure sensor is connected with the first oil port and the second oil port; and the port P, the port T, a port A and a port B of the hydraulic cartridge rotary direct-drive valve are arranged according to corresponding ports of the vane oscillating cylinder, under normal working conditions, hydraulic oil at a port P of the vane oscillating cylinder is communicated with one of the first oil port or the second oil port through an internal pipeline of the hydraulic cartridge rotary direct-drive valve, and the other one of the first oil port or the second oil port is communicated with a port T of the vane oscillating cylinder through the internal pipeline of the hydraulic cartridge rotary direct-drive valve.

2. The hydraulically driven joint for the robot of claim 1, wherein the port P and the port T in the upper end surface of the center rotating shaft are respectively plugged with a flared pipe joint.

3. The hydraulically driven joint for the robot of claim 1, wherein the hydraulic cartridge rotary direct-drive valve comprises a drive motor, an upper end cover, a valve core, a valve sleeve and a lower end cover, the drive motor is connected with the valve core, the valve sleeve is sheathed on an outer periphery of the valve core, the upper end cover and the lower end cover are sealed at two axial ends of the valve sleeve, the valve core is internally provided with a channel P, channel T, a channel A and a channel B which are not communicated with each other, the valve body installation cavity is prefabricated with the first oil port and the second oil port, two sides of the side convex vane are respectively provided with a third oil port and a fourth oil port corresponding to the first working cavity and the second working cavity, the third oil port is communicated with the first working cavity, the fourth oil port is communicated with the second working cavity, each third oil port is connected with the first oil port through the first built-in pipeline, the fourth oil port is connected with the second oil port through the second built-in pipeline, a lower surface of the upper end cover and an upper surface of the lower end cover are provided with concave working oil grooves, working edges of the concave working oil grooves are matched with working edges projected by the channel A and the channel B of the valve core for working, outer peripheral annular surfaces of the valve core corresponding to the channel P, the channel A and the channel B are respectively provided with a corresponding first oil through hole, a corresponding second oil through hole is provided at an outer periphery of the valve sleeve, and positions and sizes of the first oil through hole and the second oil through hole ensure that a servo valve can work normally under a working state.

4. The hydraulically driven joint for the robot of claim 3, wherein the valve sleeve is sheathed on the outer peripheral annular surface of the valve core, the peripheral annular surface of the valve core and an inner peripheral annular surface of the valve sleeve are assembled in radial clearance fit, the valve core comprises a center shaft, an upper end and a lower end of the center shaft respectively protrude outwardly from a corresponding end surface of the valve sleeve, the upper end cover is covered on the upper end surface of the valve sleeve and is in radial clearance fit with an upper convex portion of the center shaft at the same time, the upper convex portion of the center shaft penetrates through a center through hole and then is connected with an output end of the DC brushless servo motor, the lower end cover is covered on the lower end surface of the valve sleeve, and meanwhile, a center blind hole of the lower end cover is in radial clearance fit with a lower convex portion at a bottom of the center shaft, the two end surfaces of the valve sleeve are fixedly connected with the upper end cover and the lower end cover respectively, and the lower surface of the upper end cover and the upper surface of the lower end cover are provided with the concave working oil grooves.

5. The hydraulically driven joint for the robot of claim 3, wherein an external thread is provided at an axial outer peripheral annular surface of the upper end cover, which is used for connection and installation with an internal thread of the valve body installation cavity.

6. The hydraulically driven joint for the robot of claim 4, wherein an annular groove is arranged in the center through hole of the upper end cover, a Glyd Ring is embedded in the annular groove, a first stepped shaft is provided at an upper convex end of the center shaft, the first stepped shaft is in radial clearance fit with the center through hole, and an inner wall of the Glyd Ring is tightly attached to a corresponding position area at an upper end of the center shaft; and a second stepped shaft is provided at a lower convex end of the center shaft, and the second stepped shaft is in radial clearance fit with the center blind hole of the lower end cover.

7. The hydraulically driven joint for the robot of claim 3, wherein outlines of the working edges projected by the channel A and the channel B of the valve core are in a fan-shaped annular structure, the working edges of the corresponding concave working oil grooves of the upper end cover and the lower end cover are in a fan-shaped annular structure, and the working edges of the valve core in a zero position state are respectively fit with the working edges corresponding to the upper end cover and the lower end cover to form a zero opening, and make the channel P, the channel T, the channel A and the channel B be isolated from each other.

8. The hydraulically driven joint for the robot of claim 1, wherein the upper cover is sheathed on the center rotating shaft and located at an upper portion of the side convex ring, the lower cover is sheathed on the center rotating shaft and located at a lower portion of the side convex ring, equivalent integral outer annular surfaces corresponding to the side convex vane and the stator are sheathed with the cylinder bodies, inner grooves of axial inner ends of the upper cover and the lower cover are respectively provided with an angular contact ball bearing, and inner grooves of axial outer ends of the upper cover and the lower cover are respectively provided with a second Glyd Ring; and an inner ring of the angular contact bearing at a corresponding position is sheathed at a corresponding position of the center rotating shaft, an inner ring of the second Glyd Ring at a corresponding position is sheathed at a corresponding position of the center rotating shaft, and the upper cover and the lower cover are fixedly connected with a corresponding position of the cylinder body through a screw respectively.

9. The hydraulically driven joint for the robot of claim 8, wherein the stator is fixedly connected with the lower cover through a pin, a lower end surface of the stator is tightly attached to a corresponding end surface of the lower cover, an outer peripheral surface of the stator is tightly attached to a corresponding inner surface of the cylinder body, and an inner surface of the stator is arranged in clearance fit with a corresponding outer surface of the side convex ring.

10. The hydraulically driven joint for the robot of claim 8, wherein a thickness of the side convex vane is greater than that of the side convex ring, stepped surfaces are formed at positions of the side convex ring and the side convex vane, a thickness of the stator is the same as that of the side convex vane, the upper cover and the lower cover are respectively provided with a corresponding inner end convex ring, and an outer side wall of the inner end convex ring is tightly attached to the stator at a corresponding position and is in clearance fit with a corresponding position of the side convex vane.

\* \* \* \* \*